United States Patent [19]

Meyer

[11] 4,452,228

[45] Jun. 5, 1984

[54] SOLAR AIR TEMPERATURE CONTROL SYSTEM FOR HOUSES AND OTHER BUILDINGS

[76] Inventor: Richard C. Meyer, 813 Medoland Dr., Brigham City, Utah 84302

[21] Appl. No.: 253,733

[22] Filed: Apr. 13, 1981

[51] Int. Cl.³ .............................................. F24J 3/02
[52] U.S. Cl. ................................... 126/428; 126/415; 126/432; 126/437; 4/493
[58] Field of Search ............... 126/415, 416, 428, 429, 126/452, 432, 431, 437; 4/493, 494, 498, 506; 52/169.7, 169.11, 169.8; 47/17

[56] References Cited

U.S. PATENT DOCUMENTS

| | | | |
|---|---|---|---|
| 2,580,555 | 1/1952 | Kroeger | 126/415 X |
| 3,860,055 | 1/1975 | Wild | 126/419 X |
| 3,990,635 | 11/1976 | Restle et al. | 126/429 X |
| 4,110,172 | 8/1978 | Spears, Jr. | 126/415 |
| 4,128,124 | 12/1978 | Worthington | 126/428 X |
| 4,207,865 | 6/1980 | Allen | 126/431 |
| 4,279,240 | 7/1981 | Artusy | 126/419 |
| 4,280,480 | 7/1981 | Raposo | 126/429 |
| 4,285,331 | 8/1981 | Bloxson | 126/428 |
| 4,295,415 | 10/1981 | Schneider, Jr. | 126/428 X |

FOREIGN PATENT DOCUMENTS 820705 11/1937 France ................................. 126/415

*Primary Examiner*—Larry Jones
*Attorney, Agent, or Firm*—A. Ray Osburn

[57] ABSTRACT

A passive solar system for temperature control of the air inside homes and other buildings, comprising a pool of water to receive, store and dispense energy from direct sunlight passing through a glass wall, to strike the surface of the water in the pool. The pool has open connecting passage under its bottom and vertically along one of its sides, to form a convective conduit in which cold air is heated by the stored heat of the pool. Adjustable passages are placed through interior walls for convective flow of the pool-heated air into all desired parts of the building. The glass wall is advantageously placed for maximum incidence of heating sunlight upon the pool in winter, and maximum shading of the pool in the summer. A retractable eave may be provided to enhance these effects. During summer days, the pool serves as a heat sink, cooling the interior air. During summer nights, cooler outside air is admitted to the building to displace the warm air through ceiling and attic vents, cooling the building air, as well as the pool for the next day's use.

32 Claims, 14 Drawing Figures

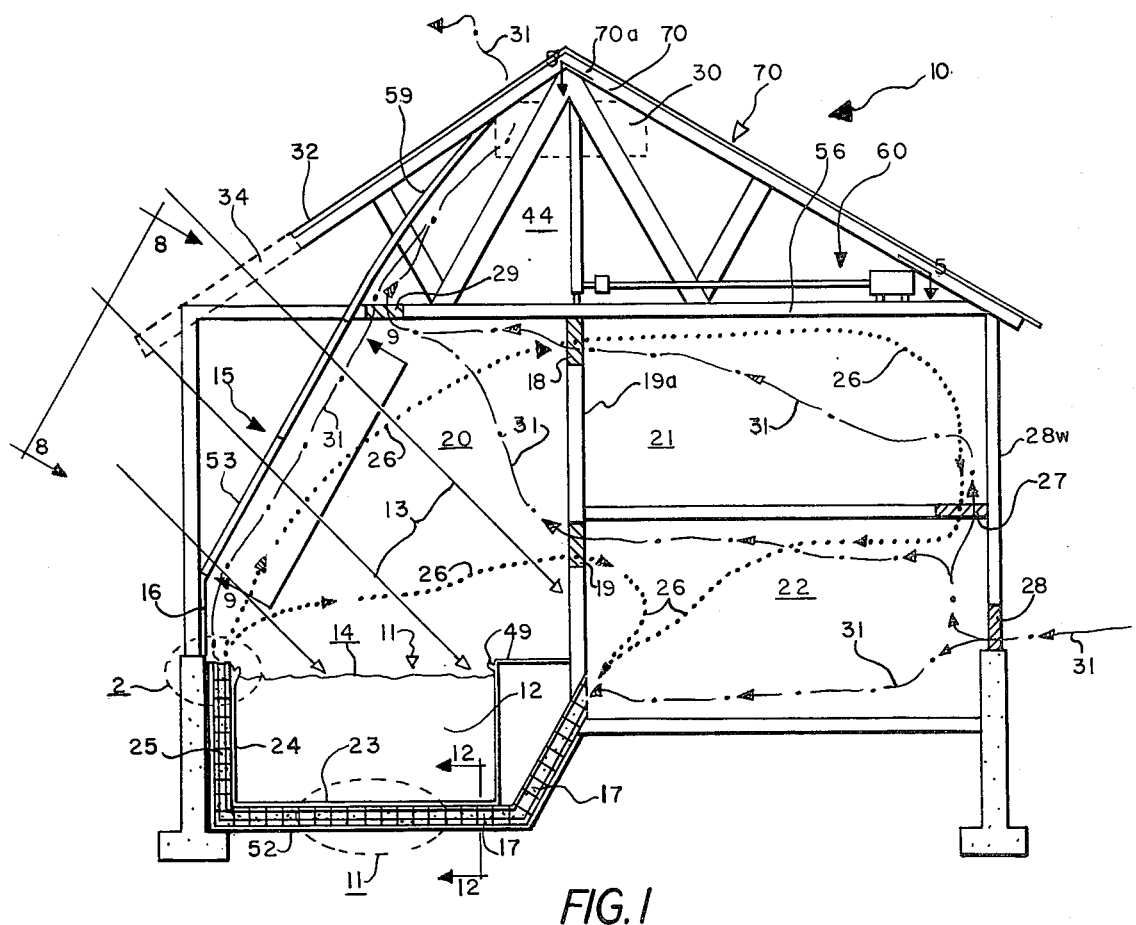
FIG. 1
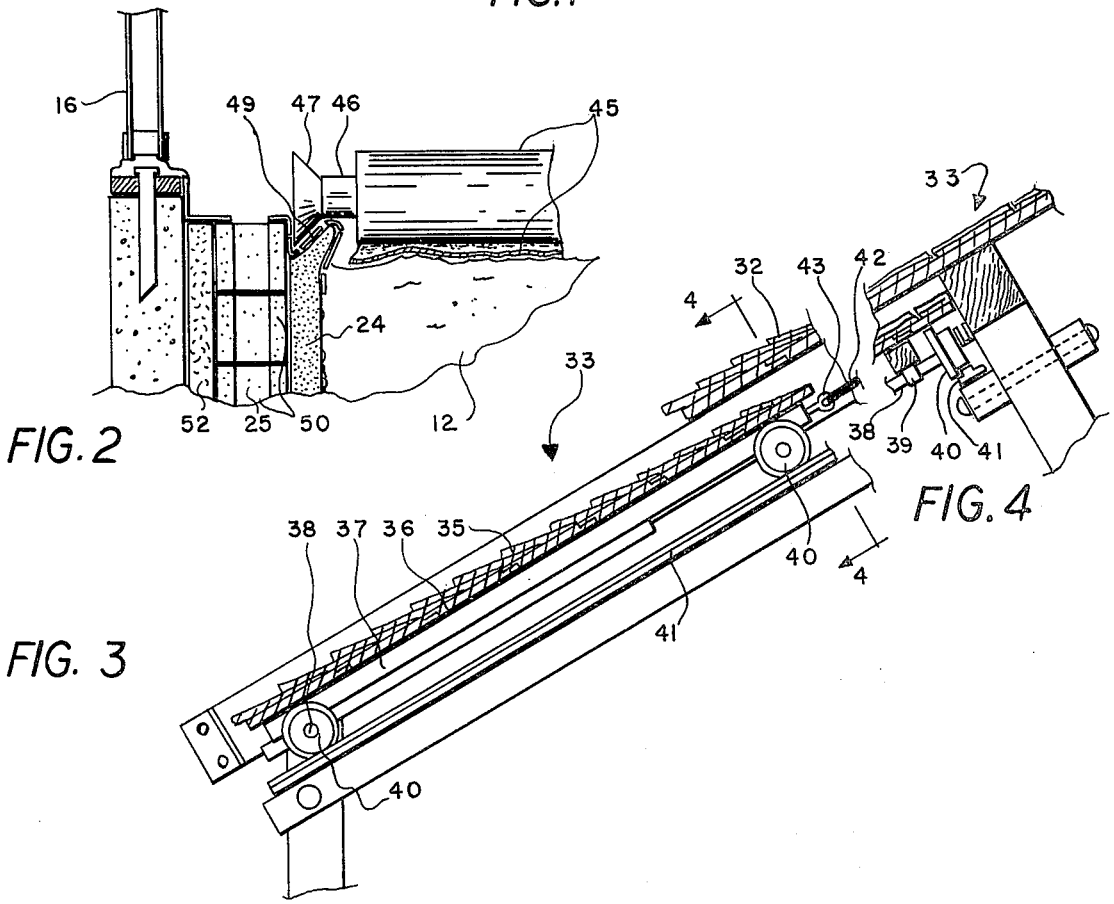
FIG. 2
FIG. 3
FIG. 4

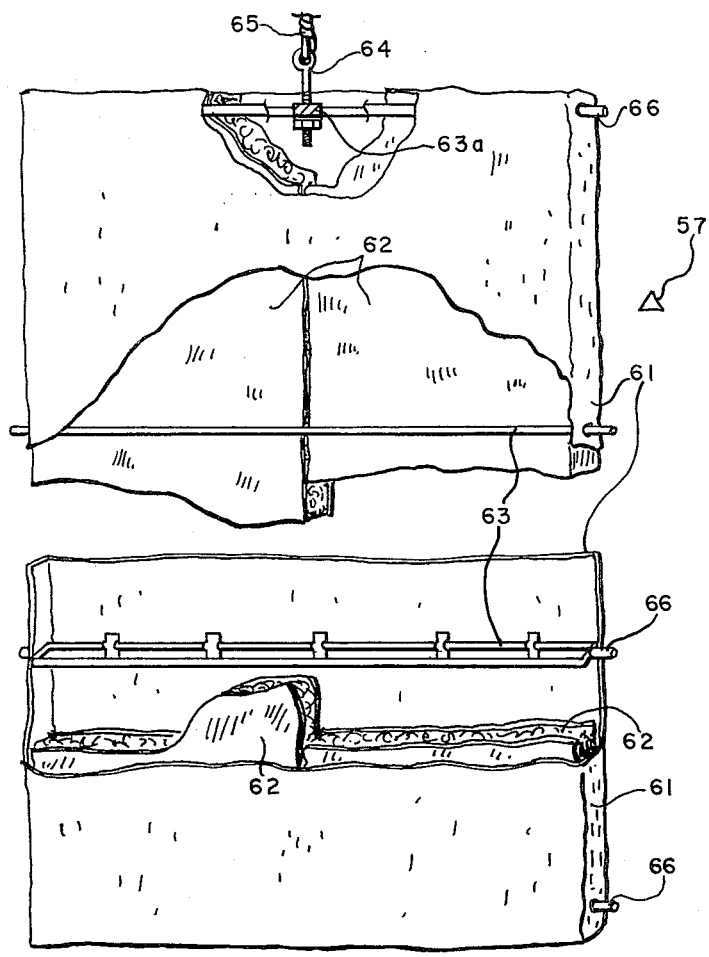
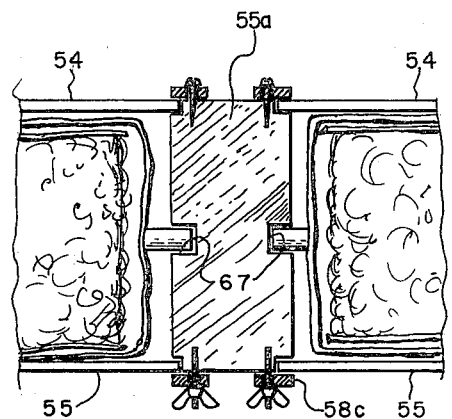
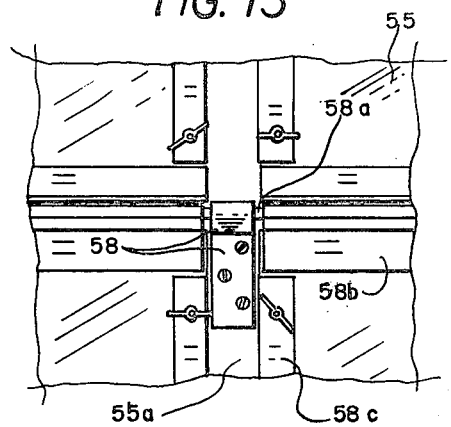
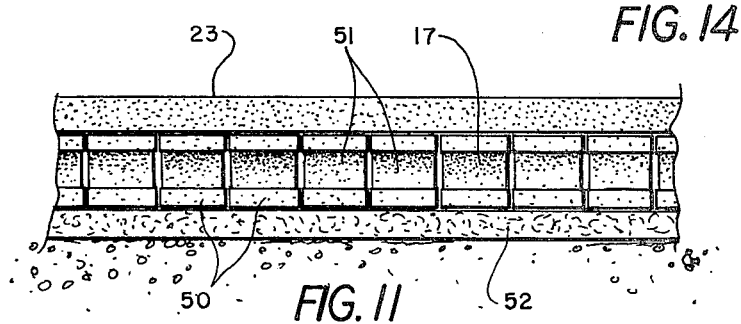
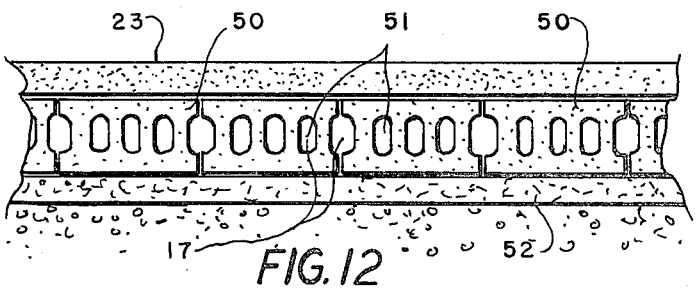

SOLAR AIR TEMPERATURE CONTROL SYSTEM FOR HOUSES AND OTHER BUILDINGS

BACKGROUND OF THE INVENTION

1. Field

The invention relates to systems for solar heating and cooling of the interior air of houses and other buildings, and more particularly to those which store thermal energy and employ thermally induced circulation for thermal energy distribution within the building. Such systems, not using pumps or blowers, are called "passive."

2. State of the Art

Various passive systems have been utilized for solar heating of buildings, some involving heat storage masses, receiving and storing heat from sunlight admitted into the structure by glazed windows, and utilizing thermally induced circulation (siphoning) for interior distribution of air subsequently heated by the storage masses. Heat storage structures include masonry thermal storage walls, which include, for example, drums or bags of water to increase the thermal capacity. Such walls are generally used with a large glazed window and enclosing walls, called a solar greenhouse, to avoid convective heat loss. The enclosed space is generally not suitable for occupancy. Thermal storage walls are lacking means of adjusting the heat flow from the sun side to the opposite living space side. Time and degree of heating of the living space is uncontrolled. Similar disadvantage exists with thermal storage roofs or ceilings, and, quite massive roof or ceiling members are required for their support. Their elevated positions in the building causes thermal siphoning to be difficult to utilize. One attempt to do so is disclosed in U.S. Pat. No. 4,193,390, wherein complicated ducting is used for the purpose of reversing the natural, upward flow of heated air.

The prior use of pooled water as collector of solar energy is seen in U.S. Pat. No. 3,161,193, disclosing an isolated pool structure containing water heated through a glazed cover. It is not adapted for passive system, since the heated water must be pumped from the pool for use.

Other patents, not considered relevant to the present invention, but concerning passive solar heating systems include U.S. Pat. Nos. 4,000,851 and 4,089,142.

The light admitting windows have been insulated to prevent loss of interior heat energy from the solar mass during darkness or cloudiness. Louvers have been used, with temperature sensing controls. Styrofoam plastic beads have been blown into and out of double paned windows. The actuation systems for the specially fabricated, bulky insulated louvers, and the collection and forced air transport system for the beads, are complicated and expensive, and may therefore suffer from impaired reliability.

BRIEF SUMMARY OF THE INVENTION

With the foregoing in mind, the present invention eliminates or substantially alleviates the disadvantages of present solar air temperature conditioning systems for houses and other buildings, by providing a passive system comprising a solar energy collection pool having open-ended air passages each extending beneath or through the bottom of the pool and upwardly along one of its sides. The air in the passages is heated by the water and rises through the pool side leg into the building space, to be replaced by a following flow of cooler air from the building. A sun-facing window, preferably double-paned and angled from the vertical to be more normal to the sunlight, admits winter sun rays to heat the water. Preferably adjustable air passages are provided through interior walls, if any, separating the collection pool area from other areas of the building, and are placed and sized to facilitate the air circulation. Similar passages may be provided in floors separating upper and lower rooms. Retractable insulation means for the window advantageously cuts heat loss at night and during cloudy periods, and advantageously comprises flexible insulating bags inserted into and withdrawn from between the dual panes into the attic space, as by a conventional garage door opener. The invention may further comprise a dark, water impervious covering upon the pool surface for more efficient heating of the pool, such as a flexible plastic sheet easily removed for swimming purposes. Retractable eave means may be provided, to shade the window in summer and to substantially expose it to the winter sun. For summer cooling of the building, adjustable exterior wall air passages and roof or attic vents may be provided. The warmer inside air flows upwardly out of the building at night drawing cooler outside air into the building to cool the water, which then serves as an efficient heat sink to cool the building the following day.

A principal object of the invention is to provide an efficient, economical, passive solar heating and cooling system for houses and other buildings. Another object is to provide such a system wherein the time and degree of cooling is controllable, and which is adaptable to buildings of various exterior and interior sizes, shapes, and space arrangements. Further objects include providing a solar energy collection pool which may also be used for swimming, a reliable and economical solar window with retractable insulation means and means for shading it in summer and exposing it to the sun in winter. Further advantages and objectives of the invention will be apparent from the following detailed description, made with reference to the accompanying drawings.

BRIEF DESCRIPTION OF THE DRAWINGS

In the drawings, which represent the best mode presently contemplated for carrying out the invention, FIG. 1 is a vertical cross sectional view of a passive solar air temperature control system in accordance with the invention, shown in conjunction with a building represented in skeleton, FIG. 2 a cross sectional view of a fragment of the solar energy collection pool of the invention taken at area 2 of FIG. 1, showing also a fragment of the retractable pool cover, drawn to a larger scale, FIG. 3 a side elevation view of the retractable eave in conjunction with a fragment of the fixed eave of the building, drawn to a larger scale than FIG. 1, FIG. 4 a cross sectional view of a fragment of the retractable eave, taken at line 4—4 of FIG. 3, drawn to the same scale, FIG. 5 a fragmented plan view of the mechanism used to retract the window insulation, taken along line 5—5 of FIG. 1, drawn to a larger scale, FIG. 6 a vertical cross sectional view of the mechanism of FIG. 5, taken along line 6—6 thereof, drawn to the same scale, FIG. 7 a fragmented vertical cross sectional view showing the solar window along with a fragment of the insulation panel guide rail in the attic of the building, FIG. 8 a fragmented view of a portion of the solar window, taken along line 8—8 of FIG. 1, drawn to a larger scale being the scale of FIG. 7, FIG. 9 a fragmented view of a portion of the solar window taken along line 9—9 of FIG. 1, drawn to the scale of FIG. 8, FIG. 10 a fragmented perspective view of the window insulation panel drawn generally to the scale of FIG. 9, FIG. 11 a vertical cross sectional view of a fragment of the air passage structure of the solar energy collection pool, taken at area 11 of FIG. 1, drawn to a larger scale, FIG. 12 a vertical cross sectional view of a fragment of the air passage structure of the solar energy collection pool, taken along line 12—12 of FIG. 1, drawn to the scale of FIG. 11, FIG. 13 a cross sectional view of a fragment of the solar window, taken along line 13—13 of FIG. 8, drawn to a larger scale, and FIG. 14 a view of a fragment of the solar window taken at area 14 of FIG. 9, drawn to the scale of FIG. 13.

DETAILED DESCRIPTION OF ILLUSTRATED EMBODIMENTS

Figure 5:
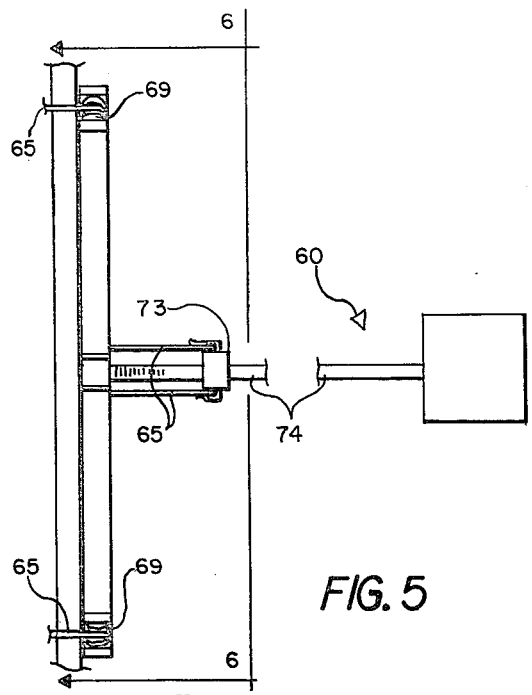

The solar air temperature control system is seen in FIG. 1 incorporated into a building 10 shown in skeleton. The system comprises a solar collector pool 11 filled with water 12 situated to receive sunlight (arrows 13) on its surface 14. The sunlight is admitted through a glazed window portion 15 of a sunward wall 16. Pool air passages 17 provide circulation of interior building air beneath the pool 11. Preferably adjustable air passages 18 and 19 through interior wall 19a communicate between pool air space 20 and occupant spaces 21 and 22 of the building. Retractable insulation is provided for window 15, its purpose and structure subsequently described in detail. The air temperature conditioning system may be utilized for both heating and cooling of the interior air of the building 10.

For winter heating of the occupant spaces 21 and 22, sunlight 13 is permitted to pass through window 15 to impinge upon pool 11 to heat the water 12. Heat from water 12 is conducted through bottom 23 and the sunward side 24 of pool 11 to heat the air in the open-ended air passages 17. Passages 17 connect the lower portion of lower occupant space 22 and pool space 20. Heated air in vertical legs 25 of passages 17 rises to draw cooler occupant space air (arrows 26) into pool passages 17 for heating therein. The heated air then rises in pool space 20 to pass through wall air passages 18 and 19 to upper and lower occupant spaces 21 and 22 respectively. A floor air passage 27 provides downward circulation from occupant space 21 to lower occupant space 22, so that the circulating air re-enters pool air passages 17. The wall and floor air passages 18, 19 and 27 are preferably adjustable for control of the circulation, and may be conventional sliding windows, adjustable louvers or the like. During daylight hours, water 12 accumulates and stores heat for the ensuing night hours, or for periods of cloudiness. During such periods, it is desirable to conserve the stored thermal energy in pool 11 by insulating window 15. Retractable insulation provided for this purpose is subsequently described.

During summer days, the solar air temperature control system serves to cool occupant spaces 21 and 22. Wall air passages 18 and 19 are opened for unimpeded circulation between the occupant spaces and the pool space. The mass of water 12 then serves as an effective heat sink, absorbing heat from the air in space 20, and being heated in the process, resulting in thermally induced circulation as above described. Floor fans are often used for occupant comfort during these periods, further increasing the circulation within the building and promoting heat transfer from the air to the water 12. Window 15 may be insulated to exclude solar thermal energy. However, this is generally not required when a window shading eave is provided as subsequently described.

During summer nights, cooler outside air is utilized to cool water 12 for the heat sink use the following day. One or more adjustable air inlet passages 28 are provided, preferably in north wall 28w, along with adjustable ceiling and attic air vent passages 29 and 30 respectively. The warmer interior air exists therethrough drawing cooler outside air (dashed arrows 31) throughout building 10. Water 12 is cooled through the night, losing heat to the cooler air 31 in building 10, by radiation, conduction and convective circulation. Some of the cool air 31 is drawn through pool passages 17 to cool water 12. Wall air passages 18 and 19 may be completely or partially closed to increase cool air flow through pool passages 17, to increase pool water cooling, although at the expense of reduced cooling of occupant spaces 21 and 22.

The sunlight admitting windows 15 are preferably inclined, as shown, so that the winter sun rays 13 are more perpendicular thereto, to pass through more efficiently. Substantially the entire window 15 should preferably be exposed to the sun during the cooler seasons, unshaded by the sunward eave 32 of the house. Undesirably, window 15 is then incompletely shaded during much of the warmer seasons, although the summer sun is higher in the sky. Window insulation may be used to exclude summer sun, but it would undesirably exclude indirect sunlight also. A retractable eave 33 may be advantageously provided, to be extended during summer and retracted in winter, as may be required. See dashed line area 34 in FIG. 1. The moveable eave 33 comprises a shingled section 35 on roofing sheathing 36. (FIG. 3) The sheating 36 is placed across spaced stringers 37, having axles 38 fixed therebeneath by brackets 39. (FIG. 4) Rollers 40 on axles 38 travel on guide rails 41 during movement of the eave. A cable 42 attached to an eyebolt 43 is passed over a pulley, not shown, mounted in the upper part of attic 44 before being connected to a drive wheel, not shown. The drive wheel is operated through a gear box by a reversible electric motor, not shown. Operation of the motor in one direction winds up cable 42 to retract eave 33. Reversal of the motor allows eave 33 to roll by gravity down the rails 41 to provide shading of window 15. If desired, manual cranking or pulley provisions, not shown, could be provided for positioning eave 33.

It is advantageous for the surface 14 of pool 11 to be covered with a dark sheet 45 of plastic or other water impervious material. (FIG. 2) This improves the heat absorption by the water 12 from incident solar radiation 13 and reduces evaporation. For swimming purposes, a spindle 46 may be advantageously provided, upon which sheet 45 may be rolled. Roller ends 47 ride in grooves 49 at top of the side walls of pool 11.

The pool air passages 17 may be advantageously constructed of rows of concrete blocks 50, having open cores 51 aligned to form the passages 17. (FIGS. 11 and 12) The concrete provides additional thermal storage mass. Heat loss from blocks 50 to the underlying soil may be minimized by styrofoam sheets 52 or other insulating material. The very large total air flow area in the passages 17 assures low air velocity for efficient heat transfer, and objectionable drafts do not occur within the building 10.

Figure 6:
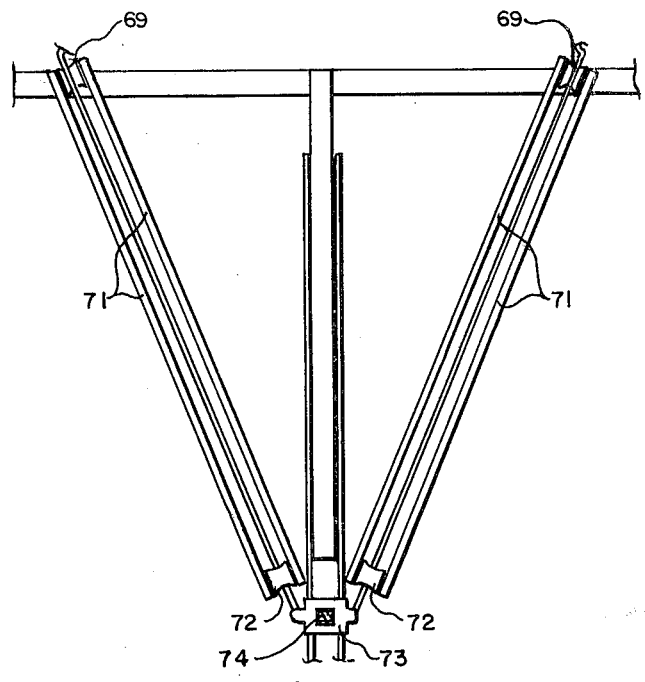
Figure 8:
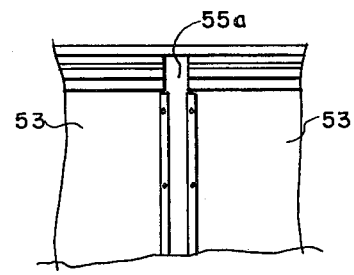
Figure 9:
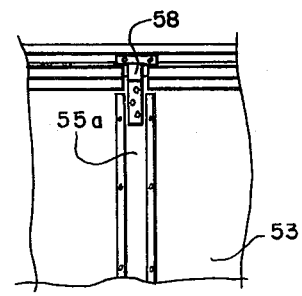

Solar energy admitting window 15 is advantageously made up of a number of window units 53, each having paired, spaced apart outer and inner glass panes 54 and 55 respectively. (FIGS. 7-9) The space between the panes is unobstructed so that each vertical row of units 53 provides an elongate open passage from the bottom of window 15 to ceiling 56. An elongate insulation panel or packet, such as flexible bag 57, is inserted downwardly into the passage between the panes. (FIG. 7) The panes 54 and 55 are secured to wooden window framing members 55a, extending the full height of window 15. (FIG. 13) The inner panes 55 may advantageously be pivotally connected at their upper edges as by hinge members 58, engaging hinge pin 58a carried by upper framing member 58b. Inside window retaining strips 58c are removed to allow panes 55 to pivot downwardly and inwardly to provide access for pane cleaning. (FIG. 14) Insulation bag side guide rails 59 are provided beginning generally at ceiling 56 and extending into attic 44. The guide rails 59 curve so that the bags 57 may be drawn completely from window 15 un-enclosed into attic 44, as by a conventional automatic garage door opener 60. (FIGS. 1, 5 and 6)

Figure 7:
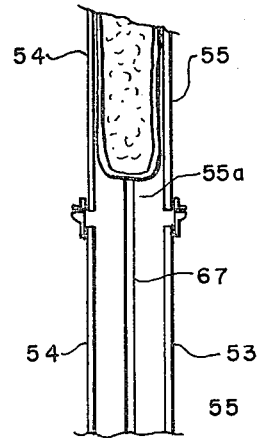

Each insulation bag 57 is sized to substantially fill the space of each vertical passage the full height of window 15. (FIG. 10) Each includes an outer covering 61 encasing a pair of conventional elongate side-by-side rectangular insulation bats 62. (FIG. 10) Bag 57 is advantageously stiffened laterally at spaced intervals, and at each end, by rigid interior bag frames 63. The uppermost stiffener 63 carries also a central cross piece 63a, having an eyebolt 64 for attachment of a bag lifting cable 65. Each bag stiffener 63 has centrally at each end a guide pin 66 extending through bag cover 61. Pins 66 engage guide channels 67 in the vertical window framing members 55a, so that the bag does not rub either of the panes during movement. (FIG. 13) Attic bag guide rails 59 may have similar channels 63. (FIG. 7)

Garage door opener 60 may be adapted to raise one or more of the insulation bags 57, and is illustrated for two. (FIGS. 5 and 6) Each bag cable 65 is attached to bag eyebolt 64, and is directed by a pulley 69 secured beneath roof 70 near ridge 70a inside attic 44. (FIGS. 1 and 5) Pulley 69 directs the cables 65 each between one of two downwardly converging pairs of stringers 71, to and around lower cable pulleys 72 for attachment to the operating traveler 73 of the garage door opener 60. Traveler 73 is moved by an endless chain or the like, not shown, along a stand-off bar 74 towards the side of the attic opposite window 15. To lower bags 57, garage door opener 60 is reversed, the bag then lowering by gravity. Hinge vent 75, at the bottom of window 15, allows the air beneath the lowering bag to escape. The garage door opener may be arranged for automatic operation using a conventional sunlight sensitive controller, not shown.

Changes may be made from the illustrated embodiments without departing from the spirit of the invention. For example, the air temperature control system may be adapted to buildings other than that illustrated. The occupant space need not necessarily be located northwardly from pool space 20, nor be vertically separated into the two spaces 21 and 22. The dividing wall separating pool and occupant areas is also not essential, it being only necessary that the space to be heated be generally above the energy collection pool 11. Thermal window 15 could be of single pane construction, and is not necessarily inclined over the pool as illustrated. Other means for controllably insulating window 15 could be employed. The retractable eave is not essential to the basic spirit of the invention, nor is the particular method illustrated for its extension and its retraction. The pool need not essentially be adapted for swimming, nor the covering sheet be removeable or necessarily utilized at all. The pool air passages 17 could be provided within the bottom 23 and side 24 of pool 11, or as separate conduit pipes or the like within the water 12.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

That is claimed and desired to be secured by United States Letters Patent is:

1. A solar air temperature control system for houses and other buildings having enclosed interior air space having at least a part of the sunward portion thereof separated from the remaining portion thereof by interior wall means, said system comprising:

a pool structure adapted to contain water, being within said separated sunward portion of the interior air space and adjacent a sunward exterior wall of the building, and comprising a bottom and serially connected sides each upstanding from said bottom;

a glazed window in said sunward wall, placed to admit winter sunlight upon the pool of water;

pool air passage means with open entrance means within said separated remaining portion of the interior air space, extending transverse to the pool structure at a lower portion thereof to connect with an upwardly extending leg of the passage at the side of the pool near said sunward wall to open into the air space above the pool, so that heat energy is exchanged between the air in the passage and the water in the pool;

air passage means through said interior wall means connecting said separated sunward portion with at least a part of said remaining portion; and retractable thermal insulation means adapted for selectably impeding the transfer of thermal energy into and out of the building through the window.

2. The solar air temperature control system of claim 1, wherein the glazed window is placed to be generally perpendicular to the rays of sun during winter.

3. The solar air temperature control system of claim 1, further comprising:

a water impervious member adapted to cover the surface of the water thereupon, being of radiant thermal energy absorbent color and material, so as to facilitate the heating of the water from the incident sunlight.

4. The solar air temperature control system of claim 1, further comprising:

retractable eave means adapted to substantially shade the window when extended in summer and to substantially expose the window to sun rays when retracted in winter.

5. The solar air temperature control system of claim 1, wherein the pool air passage means comprises:

a multiplicity of rows of concrete blocks, each having core opening therethrough, each row extending beneath and across the bottom of the pool structure and upwardly along the exterior surface of the side of the pool structure near the sunward wall, the core openings of the blocks in each row being aligned to form at least one continuous, open-ended air passage.

6. The solar air temperature control system of claim 1, further comprising:

a water impervious member adapted to cover the surface of water thereupon, being of a radiant thermal energy absorbent color and material, so as to increase the heating of the water from the incident sunlight; and the glazed window is placed to be generally perpendicular to the rays of sun during winter.

7. The solar air temperature control system of claim 6, further comprising:

retractable eave means adapted to substantially shade the window when extended in summer and to substantially expose the window to sun rays in winter when retracted.

8. The solar air temperature control system of claim 6, wherein the pool air passage means comprises:

a multiplicity of rows of concrete blocks, each having core passages therethrough, each row extending beneath and across the bottom of the pool structure and upwardly along the exterior surface of the side of the pool structure near the sunward wall, the core openings of the blocks in each row being aligned to form at least one continuous, open-ended air passage.

9. The solar air temperature control system of claim 8, further comprising:

adjustable air inlet passage means through the lower portion of at least one exterior wall of said remaining portion of the interior air space; and adjustable air outlet means for venting air from the interior space to the exterior of the building at the upper portion thereof.

10. The solar air temperature control system of claim 6, wherein the pool covering member comprises a flexible plastic sheet adapted to be selectably placed upon and removed from the surface of the water in the pool.

11. The solar air temperature control system of claim 6, wherein the glazed window comprises:

at least one pair of inner and outer panes of glass framed in spaced apart relationship, and wherein:

said system further comprises at least one insulating panel adapted to be lowered and raised into and out of the space between the panes.

12. The solar air temperature conditioning system of claim 11, wherein:

the insulating panel comprises a flexible flat rectangular bag of substantially constant thickness filled with flexible insulation material; and wherein said system further comprises;

means for guiding the insulation bag downwardly into and upwardly out of the space between the glass panes; and power means adapted to selectably raise the bag from the space between the panes and to allow it to lower by gravity into said space.

13. The solar air temperature control system of claim 12, wherein the power means comprises:

at least one conventonal automatic garage opener power and drive unit.

14. The solar air temperature control system of claim 13, further comprising:

light sensitive power unit control means for the power unit, so that the bag may be automatically lowered thereby during the night and raised thereby during the day.

15. The solar air temperature control system of claim 6, wherein:

the interior wall passage means is adjustable.

16. The solar air temperature control system of claim 1, wherein the glazed window comprises:

at least one pair of inner and outer panes of glass framed in spaced apart relationship, and wherein:

said system further comprises at least one insulating panel adapted to be lowered into and raised out of the space between the panes.

17. The solar air temperature conditioning system of claim 16, wherein:

the insulating panel comprises a flexible flat rectangular bag of substantially constant thickness filled with flexible insulation batting material; and wherein said system further comprises;

means for guiding the insulation bag downwardly into and upwardly out of the space between the glass panes; and power means adapted to selectably raise the bag from the space between the panes and to allow it to lower by gravity into said space.

18. The solar air temperature control system of claim 17, wherein the power means comprises:

at least one conventional automatic garage opener power and drive unit.

19. The solar air temperature conditioning system of claim 18, wherein the pool passage means comprises:

a multiplicity of rows of concrete blocks, each having core passages therethrough, each row extending beneath and across the bottom of the pool structure and upwardly along the exterior surface of the side of the pool structure near the sunward wall, the core openings of the blocks in each row being aligned to form at least one continuous, open-ended air passage.

20. The solar air temperature control system of claim 19, wherein:

the interior wall passage means is adjustable.

21. The solar air temperature control system of claim 20, further comprising:

adjustable air inlet passage means through the lower portion of at least one exterior wall of said remaining portion of the interior air space; and adjustable air outlet means for venting air from the interior space to the exterior of the building at the upper portion thereof.

22. The solar air temperature control system of claim 1, wherein:

the interior wall passage means is adjustable.

23. The solar air temperature control system of claim 1, further comprising:

adjustable air inlet passage means through the lower portion of at least one exterior wall of said remaining portion of the interior air space; and adjustable air outlet means for venting air from the interior space to the exterior of the building at the upper portion thereof.

24. A solar air temperature control system for houses and other buildings having enclosed interior air space, said system comprising:

a pool structure adapted to contain water within said interior air space adjacent a sunward wall of the building, comprising a bottom and serially connecting sides upstanding therefrom;

a glazed window in said sunward wall, placed to admit winter sunlight upon the pool of water;

pool air passage means with open entrance means within the interior air space, extending transverse to the pool structure at a lower portion thereof to connect with an upwardly extending leg of the passage at the side of the pool near said sunward wall to open into the air space above the pool, so that heat energy is exchanged between the air in the passage and the water in the pool; and retractable thermal insulations means adapted for selectably impeding the transfer of thermal energy into and out of the building through the window.

25. The solar air temperature control system of claim 24, further comprising:

a water impervious member adapted to cover the surface of the water thereupon, being of a radiant thermal energy absorbent color and material, so as to increase the heating of the water from the incident sunlight.

26. The solar air temperature control system of claim 24, wherein the glazed window is placed to be generally perpendicular to the rays of sun during winter.

27. The solar air temperature control system of claim 26, further comprising:

adjustable air inlet passage means through the lower portion of at least one exterior wall of said remaining portion of the interior air space; and adjustable air outlet means for venting air from the interior space to the exterior of the building at the upper portion thereof.

28. The solar air temperature control system of claim 24, further comprising:

retractable eave means adapted to substantially shade the window when extended in summer and to substantially expose the window to sun rays in winter when retracted.

29. The solar air temperature control system of claim 24, wherein the pool air passage means comprises:

a multiplicity of rows of concrete blocks, each having core passages therethrough, each row extending beneath and across the bottom of the pool structure and upward along the exterior surface of the side of the pool structure near the sunward wall, the core openings of the blocks in each row being aligned to form at least one continuous open-ended passage.

30. The solar air temperature control system of claim 24, further comprising:

a water impervious member adapted to cover the surface of water thereupon, being of a radiant thermal energy absorbent color and material, so as to increase the heating of the water from the incident sunlight; and the glazed window is placed to be generally perpendicular to the rays of sun during winter.

31. The solar air temperature control system of claim 30, further comprising:

retractable eave means adapted to substantially shade the window when extended in summer and to substantially expose the window to sun rays in winter when retracted.

32. The solar air temperature control system of claim 30, wherein the pool covering member comprises a flexible plastic sheet adapted for to be selectably placed upon and removed from the surface of the water in the pool.

* * * * *